(12) United States Patent
Choi et al.

(10) Patent No.: US 7,308,030 B2
(45) Date of Patent: Dec. 11, 2007

(54) OBJECT ACTIVITY MODELING METHOD

(75) Inventors: Yang-lim Choi, Suwon (KR); Yun-ju Yu, Busan (KR); Bangalore S. Manjunath, Santa Barbara, CA (US); Xinding Sun, Santa Barbara, CA (US); Ching-wei Chen, Isla Vista, CA (US)

(73) Assignees: Samsung Electronics Co., Ltd., Suwon-si (KR); The Regents of the University of California, Oakland, CA (US)

( * ) Notice: Subject to any disclaimer, the term of this patent is extended or adjusted under 35 U.S.C. 154(b) by 402 days.

(21) Appl. No.: 11/103,588

(22) Filed: Apr. 12, 2005

(65) Prior Publication Data

US 2005/0220191 A1    Oct. 6, 2005

Related U.S. Application Data

(62) Division of application No. 09/916,210, filed on Jul. 27, 2001.

(30) Foreign Application Priority Data

Dec. 29, 2000   (KR) .................................. 00-86284

(51) Int. Cl.
*H04B 1/66* (2006.01)
(52) U.S. Cl. ........................... 375/240.16; 375/240.26; 348/699; 348/700; 704/256.1; 704/256.2; 704/256.4

(58) Field of Classification Search ............ 375/240.16, 375/240.26; 348/699, 700; 704/256.1, 256.2, 704/256.4
See application file for complete search history.

(56) References Cited

U.S. PATENT DOCUMENTS

| | | | | |
|---|---|---|---|---|
| 6,157,677 A | * | 12/2000 | Martens et al. | ........ 375/240.16 |
| 6,285,711 B1 | * | 9/2001 | Ratakonda et al. | .... 375/240.16 |
| 6,303,920 B1 | * | 10/2001 | Wixson | ................... 250/208.1 |
| 6,366,701 B1 | * | 4/2002 | Chalom et al. | ............. 382/236 |
| 6,597,816 B1 | * | 7/2003 | Altunbasak et al. | ........ 382/275 |

FOREIGN PATENT DOCUMENTS

JP     10-255070 A     9/1998

* cited by examiner

*Primary Examiner*—Shawn S. An
(74) *Attorney, Agent, or Firm*—Sughrue Mion Pllc.

(57) ABSTRACT

An object activity modeling method which can efficiently model complex objects such as a human body is provided. The object activity modeling method includes the steps of (a) obtaining an optical flow vector from a video sequence; (b) obtaining the probability distribution of the feature vector for a plurality of video frames, using the optical flow vector; (c) modeling states, using the probability distribution of the feature vector; and (d) expressing the activity of the object in the video sequence based on state transition. According to the modeling method, in video indexing and recognition field, complex activities such as human activities can be efficiently modeled and recognized without segmenting objects.

8 Claims, 3 Drawing Sheets

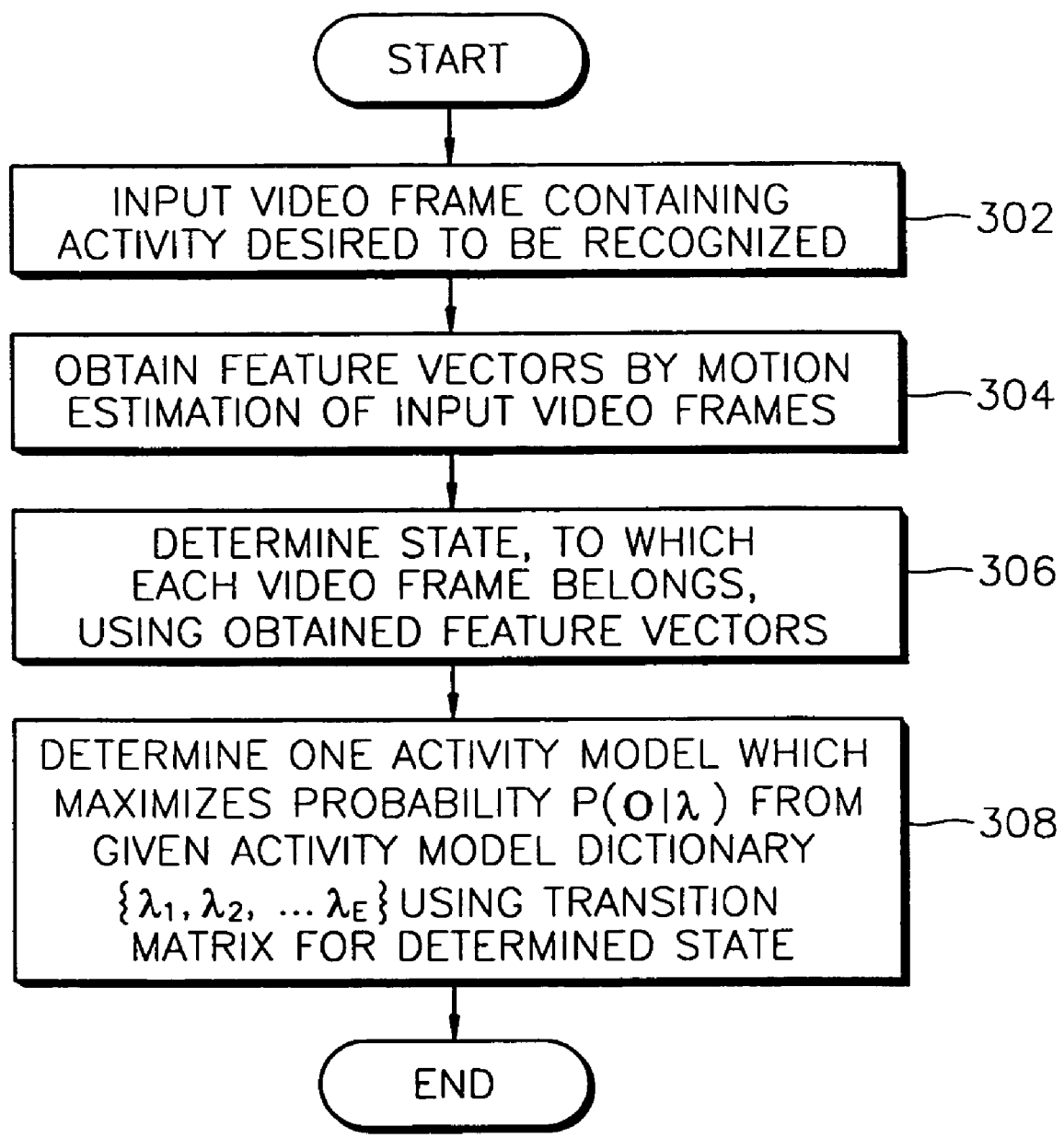

OBJECT ACTIVITY MODELING METHOD

This is a divisional of application Ser. No. 09/916,210, filed Jul. 27, 2001, the disclosure of which is incorporated herein by reference.

BACKGROUND OF THE INVENTION

1. Field of the Invention

The present invention relates to an object activity modeling method, and more particularly, to an object activity method for efficiently analyzing the activities of a complex object such as human activity. Also, the present invention relates to an object activity recognition method for recognizing activities or events of an object in a video sequence, using an object activity model modeled by the object activity modeling method.

2. Description of the Related Art

Human activities including sitting down, walking, getting up, or turning around, can be captured using a camera, and stored as digital video. It is possible to analyze the content of the digital video after obtaining the digital video. For example, the temporal and spatial features of activities of the digital video can be characterized using stochastic models based on training data. These models can be used to match a video sequence provided for pattern recognition with database videos. After pattern analysis, the video can be semantically indexed using these patterns. Also, in this process, a semantic summary of the video contents can be obtained.

The conventional object activity analyzing method can be divided into two types. In the first type of analysis method, an apparatus designed for analyzing activity is attached to a human body and used for activity analysis. In the second type of analysis method, geometric features or pictures of objects are used for activity analysis. However, in the first type, since the apparatus must be attached to a human body, the apparatuses attached to the human body restrict human activities. Also, in the second type, segmentation of individual objects from video is required. However, in many cases, individual objects cannot be accurately segmented from video. In particular, it is difficult to apply the second type of analysis method to complex objects, such as a human body which cannot be easily segmented.

SUMMARY OF THE INVENTION

To solve the above problems, it is an object of the present invention to provide an object activity modeling method which can model complex objects such as a human body.

It is another object to provide an object activity recognizing method using an activity model modeled by the object activity modeling method.

To accomplish the above object of the present invention, there is provided an object activity modeling method having the steps of (a) obtaining an optical flow vector from a video sequence; (b) obtaining the probability distribution of the feature vector for a plurality of video frames, using the optical flow vector; (c) modeling states, using the probability distribution of the feature vector; and (d) expressing the activity of the object in the video sequence based on state transition.

It is preferable that step (a) is based on affine motion estimation.

It is preferable that the step (a) further has the sub-steps of (a-1) grouping input video frames into a plurality of video frame groups and dividing each video frame group as an individual state; (a-2) obtaining an affine motion parameter for each video in the video frame group of each individual state; and (a-3) obtaining an optical flow vector form the affine motion parameters.

It is preferable that the step (a-2) has a step for determining parameters, which minimizes summed square difference $\Sigma(I_t(x)-I_{t-1}(x-V(x)))^2$ over a given video based on the intensity of the pixel on the object, which is expressed as $I_t(x)=I_{t-1}(x-V(x))$ when I denotes intensity, t denotes time, x denotes a pixel location (x, y), and v denotes the motion vector, as motion parameters.

It is preferable that the step (b) has a step for calculating probability distribution $P(Z|\Omega)$ by the following equation:

$$P(Z|\Omega) = \frac{\exp\left(-\frac{1}{2}(Z-m)^T\right)Q^{-1}(Z-m)}{(2\pi)^N |Q|^{1/2}}$$

in which $P=(p_1, p_2, \ldots, p_d)$ denotes a motion vector calculated at each pixel location (x, y), L denotes the number of pixels in a video frame or a region of interest, d denotes the number of dimensions, feature vector Z, which is a d×L dimension vector, is $Z=(P_1^1, P_1^2, \ldots, P_1^L, P_2^1, P_2^2, \ldots P_2^L, P_d^1, P_d^2, \ldots P_d^L)^T$, m is the mean vector of feature vector Z, and Q is the covariance matrix of feature vector Z, and it is assumed that feature vector Z is provided from observation class $\Omega$.

It is preferable that the step (b) further has the steps of decomposing covariance matrix Q as the following equation:

$$Q = \Phi \Lambda \Phi^T$$

in which $\hat{Z}$ is equal to Z−m, the columns of $\Phi$ are orthonormal eigenvectors of covariance matrix Q, and A corresponds to the diagonal eigenvalue; and calculating probability distribution $P(Z|\Omega)$ by the following equation:

$$P(Z|\Omega) = \left[\frac{\exp\left(-\frac{1}{2}\sum_i^M y_i^2/\alpha_i\right)}{(2\pi)^M |\Lambda|^{1/2}}\right]\left[\frac{\exp\left(-\frac{1}{2}\sum_{M+1}^N y_i^2/2\rho\right)}{(2\pi\rho)^{(N-M)/2}}\right]$$

in which M is the number of principal components, $y_i$ is the i-th component of Y, $\alpha_i$ is the i-th eigenvalue of Q, and $\rho$ is the optimal value, which is obtained by $$\rho = \frac{1}{N-M}\sum_{M+1}^N \alpha_i,$$

and it is assumed that feature vector Z is provided from observation class $\Omega$.

It is preferable that in the step (c), the object activity in the video equence is expressed using a Hidden Markov Model (HMM), based on state transition.

It is preferable that the Hidden Markov Model (HMM) is expressed as $\lambda=\{\Xi, A, B, \Pi\}$ when N is the number of possible states, $\Xi$ satisfies $\Xi=\{q_1, q_2, \ldots, q_N\}$, A is $\{a_{ij}\}$, the transition between hidden states i and j, B is $\{b_j(.)\}$, the observation symbol probability corresponding to state j, and $\Pi$ is the initial state distribution, and the state $\Xi=\{q_1,$ $q_2, \ldots, q_N\}$ and the initial state distribution $\Pi$ are determined in advance based on video data.

To accomplish another object of the present invention, there is also provided an object activity recognition method having the steps of (a) obtaining feature vectors by motion estimation for video frames; (b) determining a state, to which each frame belongs, using the obtained feature vectors; and (c) determining an activity model, which maximizes the probability between activity models and a video frame provided from a given activity model dictionary using a transition matrix for the determined state, as the recognized activity.

BRIEF DESCRIPTION OF THE DRAWINGS

The above objects and advantages of the present invention will become more apparent by describing in detail a preferred embodiment thereof with reference to the attached drawings in which:

FIG. 3 is a flowchart showing the principal steps of an object activity recognition method according to an embodiment of the present invention.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
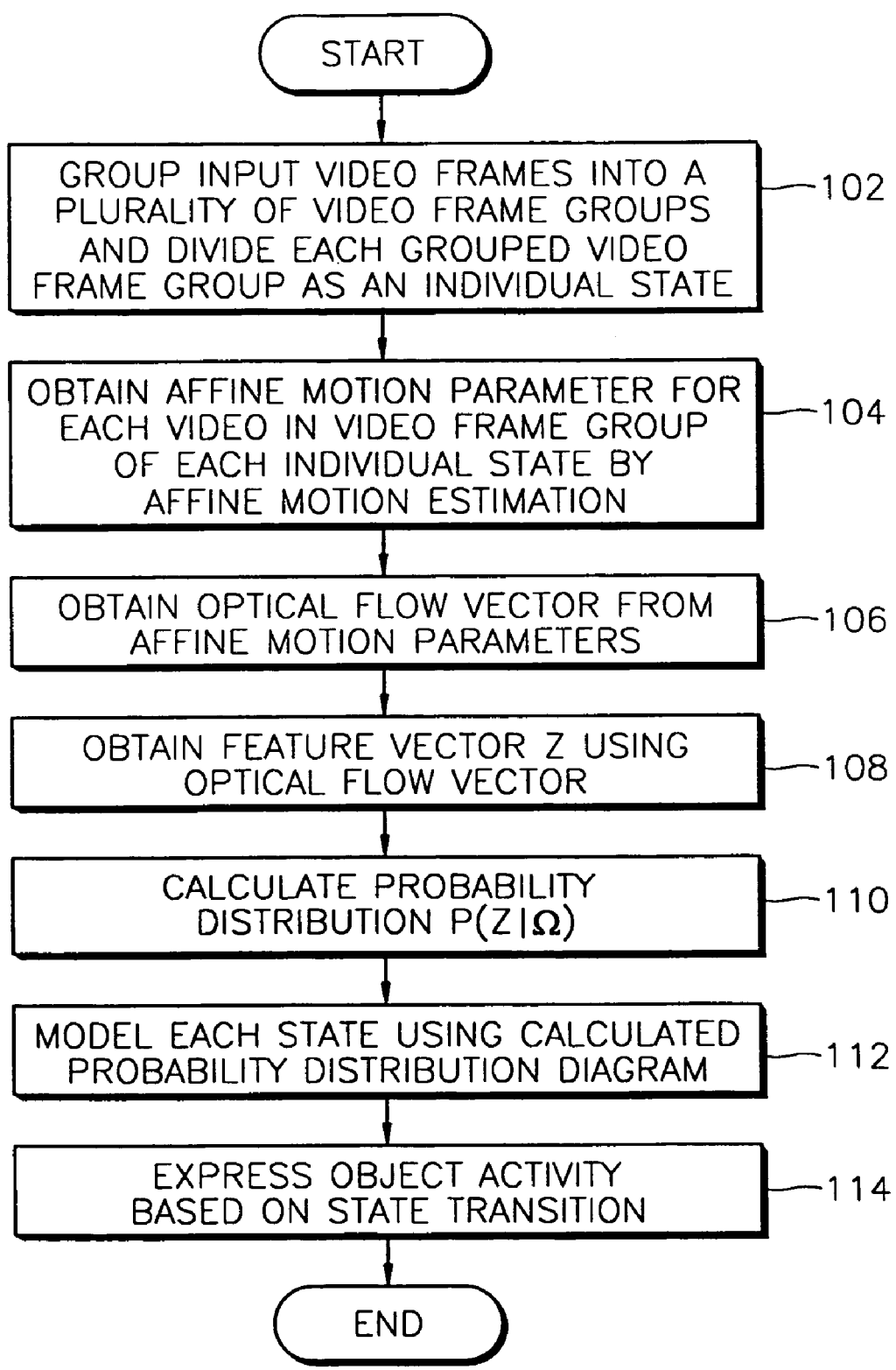
FIG. 1 is a flowchart showing the principal steps of an object activity modeling method according to an embodiment of the present invention.

FIG. 1 is a flowchart showing the principal steps of an object activity modeling method according to an embodiment of the present invention. Since all types of object activities can be interpreted as objects undergoing changes of different types of motions, it is preferable that activities are considered in relation to the motion distribution of an object. Therefore, in the present invention, human activities are modeled based on motion distribution. In the present embodiment, motion estimation based on a model is applied instead of applying precise motion estimation.

Referring to FIG. 1, in the object activity modeling method according to an embodiment of the present invention, first, video frames, which are input by manual state model selection, are grouped into a plurality of video frame groups, and each of the grouped video frame groups are divided into individual states in step 102.

An affine motion parameter is obtained by affine motion estimation for each video in the video frame group of each individual state in step 104. Here, when I denotes intensity, t denotes time, x denotes a pixel location (x, y), and V denotes the motion vector, motion estimation is based on the intensity of a pixel on the object, which is expressed by the following Equation 1:

$$I_t(x) = I_{t-1}(x - V(x)) \tag{1}$$

That is, parameters that minimize the following summed square difference $\Sigma(I_t(x) - I_{t-1}(x - V(x)))^2$ over a given region are estimated as motion parameters.

In model-based motion estimation, if the size of an object is much smaller than the distance between the camera and the object, the motion of the object can be approximated using the affine model. If each point in the video is expressed using a local window, for example, a 5×5 pixel size window, the motion can be approximated using affine model parameters. The affine model is expressed in Equation 2:

$$V(x, y) = \Psi(x, y) K \tag{2}$$

Here, (x, y) denotes the coordinates of an arbitrary point on the object, $w(x,y) = (u(x,y), w(x,y))^T$ is the motion vector, $K = (k_1, k_2, k_3, k_4, k_5, k_6)$ is the affine model parameter, and $$\Psi(x, y) = \begin{pmatrix} 1 & x & y & 0 & 0 & 0 \\ 0 & 0 & 0 & 1 & x & y \end{pmatrix}.$$

Also, it should be noted that $k_1$ and $k_4$ correspond to orthonormal movements, and $k_2$, $k_3$, $k_5$, and $k_6$ correspond to deformation of the surface. At this time, if $k_2$, $k_3$, $k_5$, and $k_6$ are neglected, motion vector V can be expressed as $V = (k_1, k_4)^T$. This motion vector $V = (k_1, k_4)^T$ is a typical optical flow vector. Therefore, the optical flow vector can be obtained from the affine motion parameters in step 106.

Motion vector $P = (p_1, p_2, \ldots p_d)$, which is calculated in each pixel location (x, y), will now be considered. For example, P can be a 6-dimensional (D) affine motion parameter or 2-D optical flow vector. When L denotes the number of pixels in a video frame or a region of interest, and d denotes the number of dimensions, the affine motion parameters can be expressed by the following Equation 3:

$$Z = (P_1^1, P_1^2, \ldots, P_1^L, P_2^1, P_2^2, \ldots, P_2^L, P_d^1, P_d^2, \ldots P_d^L)^T \tag{3}$$

That is, features vector Z, which is formed by affine motion vectors or optical flow vector, can be expressed as a d×L dimensional vector. With this method, feature vector Z is obtained from the optical flow vector in step 108.

Meanwhile, feature vector Z can be modeled as a Gaussian function. At this time, the mean of the Gaussian function is referred to as m, and the covariance matrix of the feature vector Z, which is expressed in a matrix, is referred to as $\Omega$. If feature vector Z is provided from observation class $\Omega$, probability distribution $P(Z|\Omega)$ can be calculated by the following Equation 4:

$$P(Z \mid \Omega) = \frac{\exp\left(-\frac{1}{2}(z - m)^T Q^{-1}(Z - m)\right)}{(2\pi)^N |Q|^{1/2}} \tag{4}$$

Here, Z denotes the feature vector, m denotes the mean vector of the feature vector, and Q denotes the covariance matrix of the feature vector Z.

However, if the probability for an observation class is calculated according to the Equation 4, and the number of video pixels and the number of dimensions are considered, the amount of computation required to obtain the probability is great. Therefore, in the present embodiment, using the Karhunen-Loeve Transform (KLT), computation of the equation is simplified. First, it is defined that $\hat{Z}$ is equal to Z−m. Next, if the columns of $\Phi$ are orthonormal eigenvectors of Q and $\Lambda$ corresponds to the diagonal eigenvalue, the covariance matrix can be decomposed as in Equation 5:

$$Q = \Phi \Lambda \Phi^T \tag{5}$$

Based on this, if M is the number of principal components, $y_i$ is the i-th component of Y, $\alpha_i$ is the i-th eigenvalue of Q, and ρ is the optimal value, which is obtained by $$\rho = \frac{1}{N-M} \sum_{M+1}^{N} \alpha_i,$$

Equation 4 can be approximated by the following Equation 6:

$$P(Z|\Omega) = \left[\frac{\exp\left(-\frac{1}{2}\sum_{i}^{M} y_i^2/\alpha_i\right)}{(2\pi)^M |\Lambda|^{1/2}}\right]\left[\frac{\exp\left(-\frac{1}{2}\sum_{M+1}^{N} y_i^2/2\rho\right)}{(2\pi\rho)^{(N-M)/2}}\right]_i \quad (6)$$

Therefore, in the present embodiment, if the feature vector Z is provided from the observation class Ω, probability distribution P(Z|Ω) is calculated using Equation 6 in step 110. Then, using the probability distribution calculated as described above, each state is modeled in step 112.

Next, based on state transition, the activity of the object in the video sequence is expressed in step 114. In the present embodiment, to express the activity of the object in the video sequence, a Hidden Markov Model (HMM) is used. The HMM is well-known as an excellent stochastic model in training and recognizing data which diversely changes as time passes. Particularly, the HMM is widely used in recognizing online character or voice which is continuously input. In voice recognition using an HMM, under the assumption that voice can be modeled into a Markov model, a reference Markov model is generated by obtaining a probability parameter of a Markov model in the training process. Also, in the voice recognition process, voice is recognized by estimating a reference Markov model which is most similar to the input utterance. Generally, a hidden Markov model is used as a model to recognize voice and the reason for this is to accommodate diverse changes in voice patterns. Here, the word "hidden" indicates that the state is hidden in a model regardless of voice patterns. When N is the number of possible states, Ξ satisfies Ξ={$q_1, q_2, \ldots, q_N$}, A is {$a_{ij}$}, the transition between hidden states i and j, B is {$b_j(.)$}, the observation symbol probability corresponding to state j, and π is the initial state distribution, a generic HMM can be represented by the following Equation 7:

$$\lambda = \{\Xi, A, B, \Pi\} \quad (7)$$

The state Ξ={$q_1, q_2, \ldots, q_N$} and the initial state distribution Π are determined in advance based on video data. Hidden Markov model parameters A and B can be repeatedly trained using known Baum-Welsh re-estimation formula.

The number of state models or states can be empirically determined and in the present embodiment, an example in which four states are selected will be explained. Also, in the present embodiment, an activity is modeled using four states, and an example of setting an identical value to the transition probability of each state will be explained.

Figure 2A:
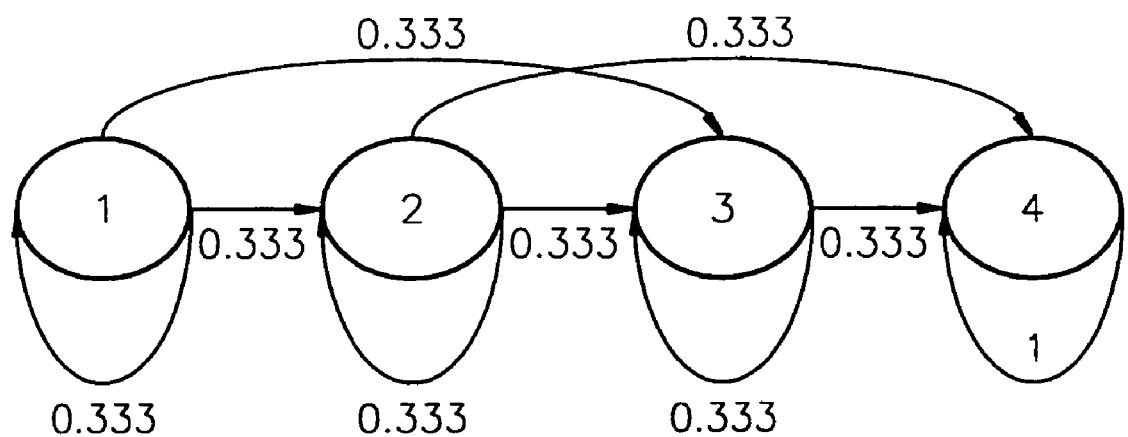
FIG. 2A is a diagram showing an example of a Hidden Markov Model (HMM) of an activity, in which a man starts to get up but returns to the sitting position, before training.
Figure 2B:
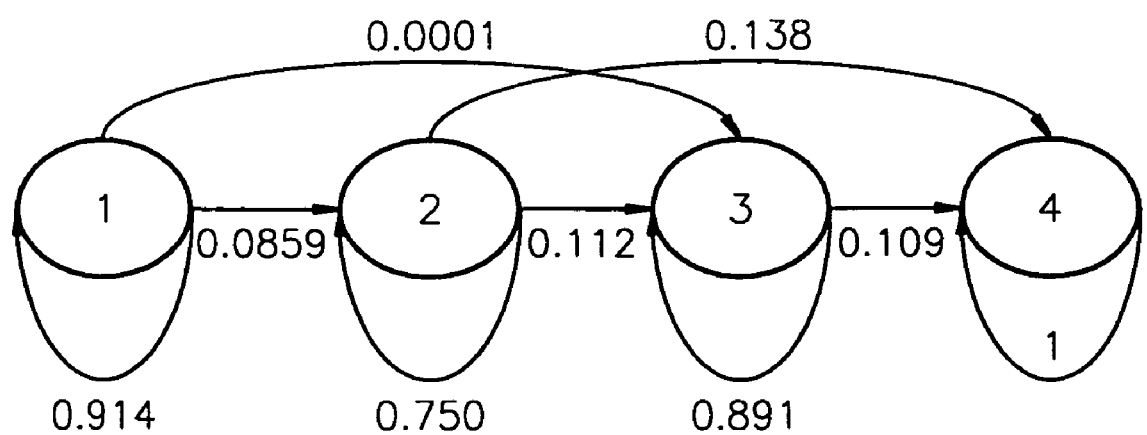
FIG. 2B is a diagram showing an example of a Hidden Markov Model (HMM) of an activity, in which a man starts to get up but returns to the sitting position, after training.

FIGS. 2A and 2B show examples of the Hidden Markov Model of an activity, in which a man starts to get up but returns to the sitting position, (hereinafter, referred to as 'bd'). FIG. 2A shows an example of the Hidden Markov Model of bd before training, and FIG. 2B shows an example of the Hidden Markov Model of bd after training. Referring to FIG. 2A, the probability that a transition from one state to another state will occur and the probability that a transition from one state to a previous state will occur are identically set to 0.333. For convenience of model development, it is assumed that the probability that returning from a state referred to as 4 to 4 occurs is 1. However, referring to 2B, the probability that a transition from a state to another state will occur and the probability that transition from a state to the previous state occurs are differently set. Next, using the transition probabilities which are differently set, the transition matrix is obtained. Then, the plurality of different states defined by respective different probability distributions and the obtained transition matrix are determined as the activity model. By doing so, modeling for the activity is completed.

According to the object activity modeling method described above, complex activities such as human activities can be efficiently modeled in video indexing and recognition field. Particularly, according to the object activity modeling method, object activities needed for activity recognition can be modeled with segmenting objects.

The object activity modeling method according to the above-described embodiment can be applied to systems such as static cameras. However, if the system to which the method is desired to be applied is a motion camera, human motions must first be restored. The following steps are the same as the above-described embodiment.

The process for recognizing an activity will now be explained. FIG. 3 is a flowchart for showing principal steps of an object activity recognition method according to an embodiment of the present invention. Referring to FIG. 3, first, video frames containing an activity desired to be recognized is input in step 302. Next, feature vectors are obtained by motion estimation of input video frames in step 304. The step 304 can be understood to be substantially the same as the step 106 explained with reference to FIG. 1.

Next, using the obtained feature vectors, a state, to which each video frame belongs, is determined in step 306. If T is a positive integer indicating the number of frames forming the video sequence, $Z_1, Z_2, \ldots, Z_T$ are feature vectors of first frame, second frame, . . . , T-th frame, respectively, and if video frame O={$Z_1, Z_2, \ldots, Z_T$} is given and E is the number of state models, one activity model, which maximizes probability P(O|λ) between the provided video frame and the activity model, from the given activity model dictionary {$\lambda_1, \lambda_2, \ldots, \lambda_E$} is determined as the recognized activity in step 308. The transition matrix is obtained by using an expectation-maximization (EM) algorithm based on the observation symbol probability {$b_j(.)$} corresponding to scene j in the training process. To enhance the search speed, it is preferable to track the movement trace in a window having the same size as used in training, based on a prediction algorithm using the Kalman filter, formed of three steps, including initialization, state prediction, and measuring and updating.

In this way, it is possible to recognize complex object activities such as human activity in a video sequence. According to the object activity recognition method, complex activities such as human activity can be efficiently recognized. Particularly, according to the object activity recognition method, the activity can be recognized without segmenting the object.

Furthermore, the object activity modeling method and object activity recognition method according to the present invention can be written as a program executed on a personal computer or a server computer. Computer programmers in the industry can easily infer the program codes and code segments constructing the program. Furthermore, the program can be stored in a computer-readable recording medium. The recording medium can include a magnetic recording medium, an optical recording medium, and a radio medium.

As described above, according to the present invention, in video indexing and recognition field, complex activities such as human activities can be efficiently modeled and recognized without segmenting objects.

What is claimed is:

1. An object activity modeling method comprising the steps of:
   (a) obtaining an optical flow vector from a video sequence;
   (b) obtaining a probability distribution of a feature vector for a plurality of video frames, using the optical flow vector, wherein the feature vector is an d×L dimensional vector, d being a number of dimensions and L being a number of pixels in a video frame or in a region of interest;
   (c) modeling states, using the probability distribution of the feature vector; and
   (d) expressing the activity of the object in the video sequence based on state transition.

2. The object activity modeling method of claim 1, wherein the step (a) is based on affine motion estimation.

3. The object activity modeling method of claim 2, wherein the step (a) further comprises the sub-steps of:
   (a-1) grouping input video frames into a plurality of video frame groups and dividing each video frame group as an individual state;
   (a-2) obtaining an affine motion parameter for each video in the video frame group of each individual state; and
   (a-3) obtaining an optical flow vector from the affine motion parameters.

4. The object activity modeling method of claim 3, wherein the step (a-2) comprises a step for determining parameters, which minimizes summed square difference $\Sigma(I^t(x)-I_{t-1}(x-V(x)))^2$ over a given video based on the intensity of the pixel on the object, which is expressed as $I_t(x)=I_{t-1}(x-V(x))$ when I denotes intensity, t denotes time, x denotes a pixel location (x, y), and v denotes the motion vector, as motion parameters.

5. The object activity modeling method of claim 1, wherein the step (b) comprises a step for calculating probability distribution $P(Z|\Omega)$ by the following equation:

$$P(Z|\Omega) = \frac{\exp\left(-\frac{1}{2}(z-m)^T Q^{-1}(Z-m)\right)}{(2\pi)^{N}|Q|^{1/2}}$$

wherein $P=(p_1, p_2, \ldots, p_d)$ denotes a motion vector calculated at each pixel location (x, y), L denotes the number of pixels in a video frame or a region of interest, d denotes the number of dimensions, feature vector Z, which is a d×L dimension vector, is $Z=(p_1^1, p_1^2, \ldots, p_1^L, p_2^1, p_2^2, \ldots, p_2^L, p_d^1, p_d^2, \ldots p_d^L)^T$, m is the mean vector of feature vector Z, and Q is the covariance matrix of feature vector Z, and it is assumed that feature vector Z is provided from observation class $\Omega$.

6. The object activity modeling method of claim 1, wherein the step (b) further comprises the steps of:
   decomposing covariance matrix Q as the following equation:

$$Q=\Phi\Lambda\Phi^T$$

Wherein $\hat{Z}$ is equal to Z−m, the columns of $\Phi$ are orthonormal eigenvectors of covariance matrix Q, and $\Lambda$ corresponds to the diagonal eigenvalue; and
   calculating probability distribution $P(Z|\Omega)$ by the following equation:

$$P(Z|\Omega) = \left[\frac{\exp\left(-\frac{1}{2}\sum_{i}^{M} y_i^2/\alpha_i\right)}{(2\pi)^{M}|\Lambda|^{1/2}}\right]\left[\frac{\exp\left(-\frac{1}{2}\sum_{M+1}^{N} y_i^2/2\rho\right)_i}{(2\pi\rho)^{(N-M)/2}}\right]$$

wherein M is the number of principal components, $y_i$ is the i-th component of Y, $\alpha_i$ is the i-th eigenvalue of Q, and $\rho$ is the optimal value, which is obtained by $$\rho = \frac{1}{N-M}\sum_{M+1}^{N}\alpha_i,$$

and it is assumed that feature vector Z is provided from observation class $\Omega$.

7. The object activity modeling method of claim 1, wherein in the step (c), the object activity in the video sequence is expressed using a Hidden Markov Model (HMM), based on state transition.

8. The object activity modeling method of claim 7, wherein the Hidden Markov Model (HMM) is expressed as $\lambda=\{\Xi, A, B, \Pi\}$ when N is the number of possible states, $\Xi$ satisfies $\Xi=\{q_1, q_2, \ldots, q_N\}$, A is $\{a_{ij}\}$, the transition between hidden states i and j, B is $\{b_j(.)\}$, the observation symbol probability corresponding to state j, and $\Pi$ is the initial state distribution, and the state $\Xi=\{q_1, q_2, \ldots, q_N\}$ and the initial state distribution $\Pi$ are determined in advance based on video data.

* * * * *